(12) United States Patent
Patel et al.

(10) Patent No.: US 9,766,954 B2
(45) Date of Patent: *Sep. 19, 2017

(54) CONFIGURING RESOURCES USED BY A GRAPHICS PROCESSING UNIT

(71) Applicant: Microsoft Corporation, Redmond, WA (US)

(72) Inventors: Amar Patel, Kirkland, WA (US); Matthew D. Sandy, Bellevue, WA (US); Yuri Dotsenko, Kirkland, WA (US); Jesse T. Natalie, Redmond, WA (US); Max A. McMullen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/480,617

(22) Filed: Sep. 8, 2014

(65) Prior Publication Data

US 2016/0071230 A1 Mar. 10, 2016

(51) Int. Cl.
*G06T 1/00* (2006.01)
*G06F 9/54* (2006.01)
*G06F 9/44* (2006.01)

(52) U.S. Cl.
CPC .......... *G06F 9/541* (2013.01); *G06F 9/4443* (2013.01); *G06F 8/36* (2013.01)

(58) Field of Classification Search
CPC ..... G06T 15/80; G06F 2209/504; G06F 9/50; G06F 9/5011
See application file for complete search history.

(56) References Cited

U.S. PATENT DOCUMENTS

| | | | |
|---|---|---|---|
| 7,659,898 B2 | 2/2010 | Prokopenko et al. |
| 7,659,901 B2 | 2/2010 | Toelle et al. |
| 7,692,660 B2 | 4/2010 | Markovic et al. |
| 7,800,620 B2 | 9/2010 | Tarditi, Jr. et al. |
| 8,108,872 B1 | 1/2012 | Lindholm et al. |
| 8,319,784 B2 | 11/2012 | Srinivasan et al. |
| 8,520,021 B2 | 8/2013 | Zimmer |
| 8,566,537 B2 | 10/2013 | Ni et al. |

(Continued)

OTHER PUBLICATIONS

"International Search Report and Written Opinion Received in PCT Application No. PCT/US2015/020850", Mailed Date: Oct. 2, 2015, 19 Pages.

(Continued)

*Primary Examiner* — Hau Nguyen

(57) ABSTRACT

The application programming interface permits an application to specify resources to be used by shaders, executed by the GPU, through a data structure called the "root arguments." A root signature is a data structure in an application that defines the layout of the root arguments used by an application. The root arguments are a data structure resulting from the application populating locations in memory according to the root signature. The root arguments can include one or more constant values or other state information, and/or one or more pointers to memory locations which can contain descriptors, and/or one or more descriptor tables. Thus, the root arguments can support multiple levels of indirection through which a GPU can identify resources that are available for shaders to access.

22 Claims, 8 Drawing Sheets

```
Descriptor 300
    Type-specific data 302
    Pointer 304

API Descriptor Heap 310
    storage 312
    visible 314

Hardware Descriptor Heaps 320
    per-hardware-type storage 322
    Hardware limits 324

API Descriptor Table 330
    API Heap offset 334
    optional length 336

Hardware Descriptor Table 340
    hardware heap offset 344
    optional length 346

Root Arguments 350
    Descriptor table 352
    Root descriptor 354
    Root constant 356
```

(56) References Cited

U.S. PATENT DOCUMENTS

| | | | |
|---|---|---|---|
| 8,581,912 | B2 | 11/2013 | Oneppo et al. |
| 2010/0188412 | A1 | 7/2010 | Li et al. |
| 2013/0155077 | A1 | 6/2013 | Hartog et al. |
| 2014/0347371 | A1* | 11/2014 | Stenson .................... G06T 1/20 345/501 |
| 2014/0347375 | A1* | 11/2014 | Stenson .................... G06T 1/20 345/522 |

OTHER PUBLICATIONS

"D3D11_Shader_Resource_View Desc structure", Retrieved at: <<http://web.archive.org/web/20120814041516/http://msdn.microsoft.com/en-us/library/windows/desktop/ff476211(v=vs.85).aspx>>, Published on: Aug. 14, 2012, 3 Pages.

"How To: Create a Device and Immediate Context", Retrieved at: http://web.archive.org/web/20120101000000*/https://msdn.microsoft.com/en-us/library/windows/desktop/ff476879(v=vs.85).aspx>>, Published on: Jul. 23, 2012, 3 Pages.

"ID3D11ShaderResourceView::GetDesc method", Retrieved at: http://web.archive.org/web/20120101000000*/https://msdn.microsoft.com/en-us/library/windows/desktop/ff476629(v=vs.85).aspx>>, Published on: Jul. 23, 2012, 2 Pages.

"ID3D11Device::CreateShaderResourceView Method", Retrieved at: <<http://web.archive.org/web/20120101000000*/https://msdn.microsoft.com/en-us/library/windows/desktop/ff476519(v=vs.85).aspx>>, Published on: Jul. 29, 2012, 2 Pages.

"ID3D11ShaderResourceView interface", Retrieved at: http://web.archive.org/web/20120531144143/http://msdn.microsoft.com/en-us/library/windows/desktop/ff476628(v=vs.85).aspx>>, Published on: May 31, 2012, 2 Pages.

"Introduction to Buffers in Direct3D 11", Retrieved at: http://web.archive.org/web/20120101000000*/https://msdn.microsoft.com/en-us/library/windows/desktop/ff476898(v=vs.85).aspx>>, Published on: Oct. 30, 2012, 2 Pages.

"Introduction to a Resource in Direct3D 11", Retrieved at: <<http://web.archive.org/web/20120528102416/http://msdn.microsoft.com/en-us/library/windows/desktop/ff476900(v=vs.85).aspx>>, Published on: May 28, 2012, 3 Pages.

"Resource Interfaces", Retrieved at: <<http://web.archive.org/web/20120529054248/http://msdn.microsoft.com/en-us/library/windows/desktop/ff476172(v=vs.85).aspx>>, Published on: May 29, 2012, 2 Pages.

Fernando, et al., "Programming Graphics Hardware", In Proceeding of the EUROGRAPHICS Association, Jun. 21, 2012, 17 Pages.

Menon, et al., "iGPU: Exception Support and Speculative Execution on GPUs", In IEEE 39th Annual International Symposium on Computer Architecture, Jun. 9, 2012, 12 Pages.

Pinheiro, et al., "Introduction to Multithreaded rendering and the usage of Deferred Contexts in DirectX 11", In SBC—Proceedings of SBGames, Nov. 7, 2011, 5 Pages.

"What Mantle does", Published on: Nov. 29, 2013, Available at: techreport.com/review/25683/delving-deeper-into-amd-mantle-api/2.

"What Mantle does", Retrieved from <<http://techreport.com/review/25683/delving-deeper-into-amd-mantle-api/2>>, Nov. 29, 2013, 4 Pages.

Office Action in U.S. Appl. No. 14/324,017 mailed Mar. 10, 2016.

"Second Written Opinion Issued in PCT Application No. PCT/US2015/020850", Mailed Date: May 3, 2016, 9 Pages.

"International Preliminary Report on Patentability Issued in PCT Application No. PCT/US2015/020850", Mailed Date: Aug. 12, 2016, 14 Pages.

"Final Office Action Issued in U.S. Appl. No. 14/324,017", Mailed Date: Oct. 14, 2016, 15 Pages.

* cited by examiner

Descriptor 300
    Type-specific data 302
    Pointer 304

API Descriptor Heap 310
    storage 312
    visible 314

Hardware Descriptor Heaps 320
    per-hardware-type storage 322
    Hardware limits 324

API Descriptor Table 330
    API Heap offset 334
    optional length 336

Hardware Descriptor Table 340
    hardware heap offset 344
    optional length 346

Root Arguments 350
    Descriptor table 352
    Root descriptor 354
    Root constant 356

FIG.3A

CONFIGURING RESOURCES USED BY A GRAPHICS PROCESSING UNIT

BACKGROUND

In many computer systems, a graphics processing unit is provided as a coprocessor to a central processing unit. The graphics processing unit is specially designed to handle certain kinds of operations efficiently, particularly manipulation of image data and data describing three-dimensional structures. Computer programs running on such computer systems are written to take advantage of the graphics processing unit by specifying operations to be performed by the graphics processing unit and the resources, such as image data, textures and other data structures or data, to be used in those operations.

Operations are generally implemented as computer programs, typically called "shaders", in a language recognized by the graphics processing unit, typically called a "shader language" such as the high-level shading language ("HLSL") or the OpenGL shading language ("GLSL"). The act of instructing the graphics processing unit what resource a shader uses is called "binding" the resource to that shader. An application programming interface for the computer system generally provides a layer of abstraction through which computer programs access and configure the graphics processing unit.

Although the graphics processing unit executes the specified shaders using the resources bound to those shaders, the central processing unit configures the graphics processing unit by loading the shaders and resources into memory, and binding the resources to the shaders. Generally, such configuration is performed for each operation, i.e., shader, to be processed by the graphics processing unit just before the time that operation is requested to run. The resources used for binding (which are references to the underlying actual data) also are themselves objects that are created and deleted through the operating system, and are tracked when used to manage memory allocation and paging of the underlying resources to which they refer.

Thus, with computer programs that heavily use the graphics processing unit, such as video games, three-dimensional modeling and animation tools, image processing tools, virtual reality applications, scientific and other information visualization applications, flight simulation and the like, the central processing unit experiences significant performance overhead to simply configure the graphics processing unit.

SUMMARY

This Summary is provided to introduce a selection of concepts in a simplified form that are further described below in the Detailed Description. This Summary is intended neither to identify key or essential features, nor to limit the scope, of the claimed subject matter.

The application programming interface permits an application to specify resources to be used by a shader, executed by the GPU, through a data structure called, herein, "root arguments." A root signature is a data structure in an application that defines the layout of the root arguments used by an application. The root arguments are a data structure resulting from the application populating locations in memory according to the root signature. The root arguments can include one or more constant values or other state information, and/or one or more pointers to memory locations which can contain values, herein called "descriptors", and/or one or more references to memory locations that contain descriptors, also called "descriptor tables". Thus, root arguments can support multiple levels of indirection through which a GPU can identify resources to access from shaders.

The primary resource exposed by the application program interface to applications is the "descriptor", which is a data structure that includes a pointer to its location in memory as well as other configuration information, such as data format. Descriptors can be grouped together in a set of contiguous locations in memory, called a descriptor heap. For example, for each type of resource, descriptors of that type can be grouped together in contiguous locations within the descriptor heap. A descriptor heap can correspond to a collection of descriptors of a single resource type or a mix of resource types that have unified storage. Applications allocate descriptor heaps and store descriptors in the descriptor heaps. To identify what portion of the heap a given shader will access, applications also can create one or more descriptor tables. A descriptor table specifies one or more ranges within one or more descriptor heaps. The format of a descriptor table can be defined in the root signature.

Given any configuration of hardware capability and resource types, there may be a maximum supported size of any root arguments, root signature, descriptor heap, or descriptor table and a maximum supported number of descriptor tables, thus allowing applications to adapt to the level of capability of any given hardware.

When compiling shaders to be used with an application, a GPU driver examines the root signature defined by an application to determine where to find data and state that the application will make available to the shaders. At run time, to make resources available to a shader, an application populates the root arguments according to the root signature with the resources the application wants the GPU to have access to. If those resources include descriptor tables, then the application loads descriptors into one or more descriptor heaps. Such loading can occur any time in advance of the GPU actually referencing the data during shader execution. The descriptors can be identified individually, by descriptor heap or by descriptor tables, specified in the root arguments. Shaders, when executing, refer to the resources made available to them by the GPU according to the root arguments. The shader can be executed again with different resources, for example, if those resources are already in memory, such as in the root arguments, or are specified in one or more descriptor heaps. The application can update the values in the root arguments, such as by changing values stored in a descriptor heap and pointing descriptor table to it, or can change the root signature and provide new root arguments.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DESCRIPTION OF THE DRAWINGS

FIG. 3A is a diagram of data structures in an example implementation.

DETAILED DESCRIPTION

The following section describes an example computer system implementation that for configuring and managing resources used by a graphics processing unit within the computer system.

Figure 1:
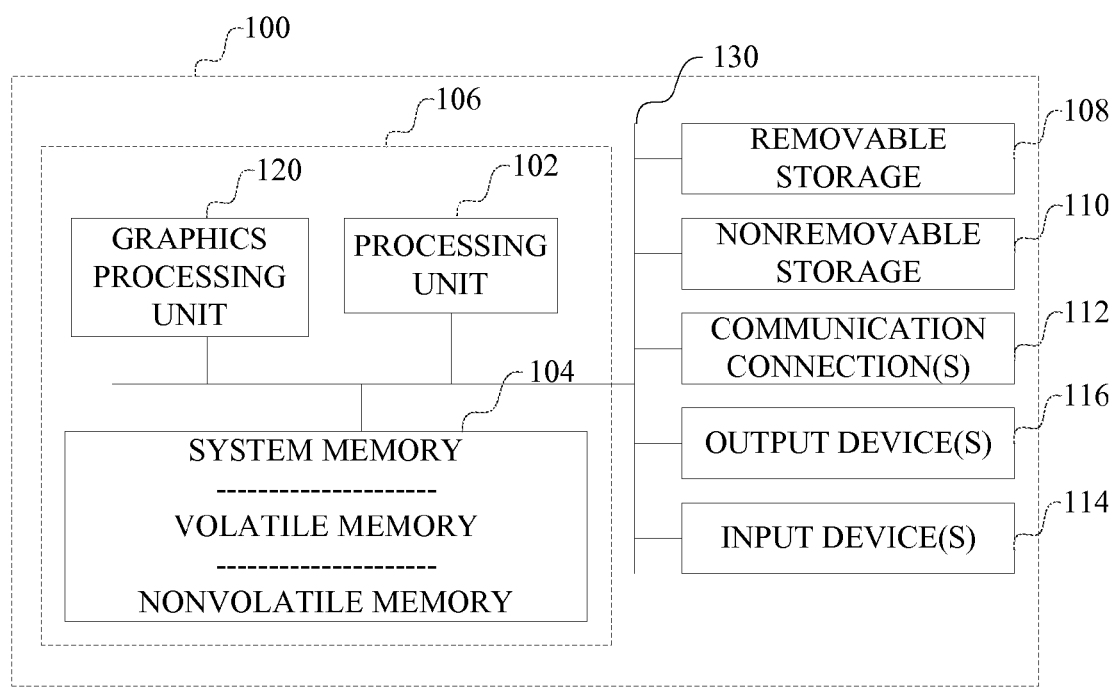
FIG. 1 is a block diagram of an example computer including a graphics processing unit.

Referring to FIG. 1, an example computer in which such techniques can be implemented will now be described. This is only one example of a computer and is not intended to suggest any limitation as to the scope of use or functionality of such a computer. The following description is intended to provide a brief, general description of such a computer. The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 1, an example computer 100 includes at least one processing unit 102 and memory 104. The computer can have multiple processing units 102. A processing unit 102 can include one or more processing cores (not shown) that operate independently of each other. Additional co-processing units, such as graphics processing unit 120, also can be present in the computer. The memory 104 may be volatile (such as dynamic random access memory (DRAM) or other random access memory device), non-volatile (such as a read-only memory (ROM), flash memory, and the like) or some combination of the two. This configuration of memory is illustrated in FIG. 1 by dashed line 106. The computer 100 may include additional storage (removable and/or non-removable) including, but not limited to, magnetically-recorded or optically-recorded disks or tape. Such additional storage is illustrated in FIG. 1 by removable storage 108 and non-removable storage 110. The various components in FIG. 1 are generally interconnected by an interconnection mechanism, such as one or more buses 630.

A computer storage medium is any medium in which data can be stored in and retrieved from addressable physical storage locations by the computer. Computer storage media includes volatile and nonvolatile memory, and removable and non-removable storage. Memory 104, removable storage 108 and non-removable storage 110 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. The computer storage media can include combinations of multiple storage devices, such as a storage array, which can be managed by an operating system or file system to appear to the computer as one or more volumes of storage. Computer storage media and communication media are mutually exclusive categories of media.

Computer 100 also can include communications connection(s) 112 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, radio frequency, infrared and other wireless media. Communications connections 112 are devices, such as a wired network interface, wireless network interface, radio frequency transceiver, e.g., Wi-Fi, cellular, long term evolution (LTE), Bluetooth, etc., transceivers, navigation transceivers, e.g., global positioning system (GPS), Global Navigation Satellite System (GLONASS), etc., that interface with the communication media to transmit data over and receive data from communication media, and may perform various functions with respect to that data. Computer 100 may have various input device(s) 114 such as a keyboard, mouse, pen, camera, touch input device, sensors (e.g., accelerometers, gyroscopes), and so on. Output device(s) 116 such as a display, speakers, a printer, and so on may also be included. All of these devices are well known in the art and need not be discussed at length here. The input and output devices can be part of a housing that contains the various components of the computer in FIG. 1, or can be separable from that housing and connected to the computer through various connection interfaces, such as a serial bus, wireless communication connection and the like. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, hover, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye , and gaze tracking, immersive augmented reality and virtual reality systems, all of which provide a more natural interface, as well as technologies for sensing brain activity using electric field sensing electrodes (EEG and related methods).

The various storage 110, communication connections 112, output devices 116 and input devices 114 can be integrated within a housing with the rest of the computer, or can be connected through input-output interface devices on the computer, in which case the reference numbers 110, 112, 114 and 116 can indicate either the interface for connection to a device or the device itself as the case may be.

A computer generally includes an operating system, which is a computer program running on the computer that manages access to the various resources of the computer by applications. There may be multiple applications. The various resources include the memory, storage, input devices and output devices, such as display devices and input devices as shown in FIG. 1. A file system generally is implemented as part of an operating system of the computer, but can be distinct from the operating system. Similarly, each component (which also may be called a "module" or "engine" or "library" or "application" or the like) of a system such as described in FIGS. 2-6 below, and which operates on a computer, can be implemented using the one or more processing units of one or more computers and one or more computer programs processed by the one or more processing units.

A computer program includes computer-executable instructions and/or computer-interpreted instructions, such as program modules or libraries, which instructions are processed by one or more processing units in one or more computers. Generally, such instructions define routines, programs, objects, components, data structures, and so on, that, when processed by a processing unit, instruct the processing unit to perform operations on data, or configure the one or more processing units to implement various components or data structures. Such components have inputs and outputs by accessing data in storage or memory and by storing data in storage or memory.

This computer system may be practiced in distributed computing environments where operations are performed by multiple computers that are linked through a communications network. In a distributed computing environment, computer programs may be located in both local and remote computer storage media.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Figure 2A:
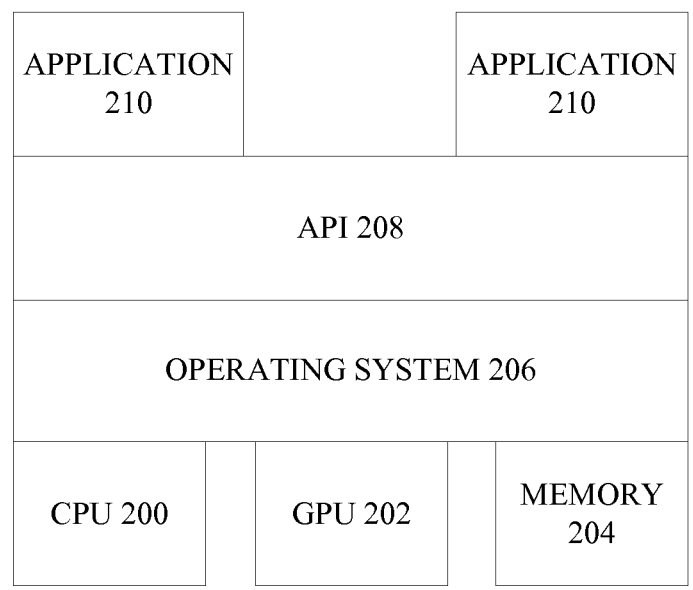
FIG. 2A is a diagram of software and hardware layers in an example implementation.

Given a computer such as described in FIG. 1, an application programming interface is provided to allow computer programs written for the computer to take advantage of the graphics processing unit. Referring to FIG. 2A, the software and hardware layers in such a computer system are illustrated. Access to the resources of the central processing unit 200, graphics processing unit 202 and memory 204 are managed by an operating system 206. Examples of commercially available operating systems include the WINDOWS operating system from Microsoft Corporation, the iOS and OS X operating systems from Apple Computer, the ANDROID operating system from Google, and variants of the LINUX operating system which are available as an open source project.

The memory resources represented by memory 204 in FIG. 2A can be implemented using any of a variety of memory architectures. For example, a computer system can have video memory used by the GPU and separate system memory used by the CPU. A computer system can have a unified memory that is shared by both the GPU and the CPU. The memory also can include one or more layers of caching. Applications access these various memory resources through the operating system. The various data structures described below, such as descriptors and descriptor heaps, can be stored in any memory resource depending on desired performance characteristics.

The operating system supports an application programming interface (API) 208 layer which abstracts specific details of the implementation of the hardware from application 210. Applications 210, such as a game engine or animation tool, utilize the software interface provided by the API layer 208 to access the GPU, CPU and memory resources. Examples of commercially available API layers are the OpenGL interface from Khronos Group and the Direct3D interface from Microsoft Corporation.

Figure 2B:
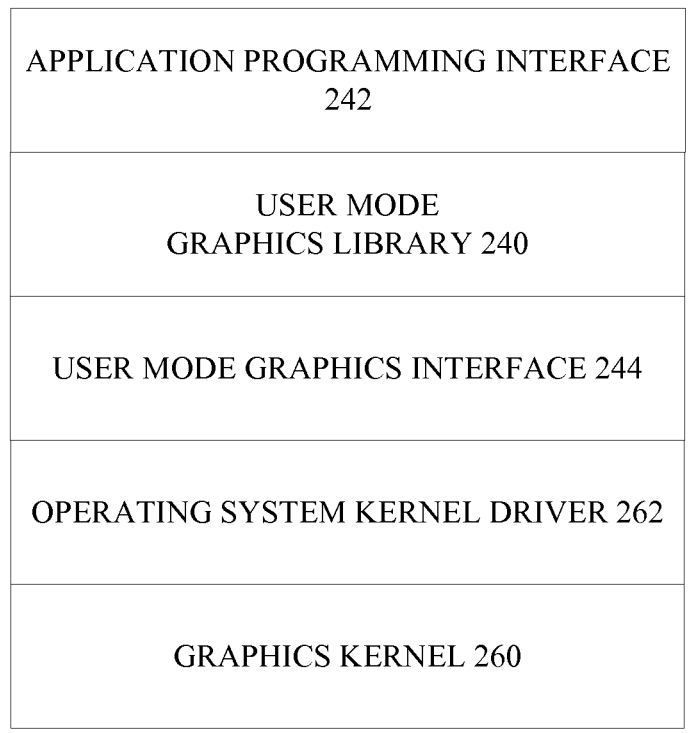
FIG. 2B is a diagram of software layers in an example implementation.

Such API layers generally are implemented using, as shown in FIG. 2B, a user mode level graphics library 240, having an application programming interface 242 for applications, and a graphics kernel 260, resident in the kernel of the operating system. Operations in the graphics library 240 access the graphics kernel through a user mode graphics interface 244, which communicates with the operating system kernel driver 262 which controls a graphics kernel 260 to manipulate the graphics processing hardware.

The application programming interface 208 decouples the tasks of making of resources resident in memory from the tasks of binding resources to shaders. Various tasks related to object lifetime management and synchronization of access to resources by the CPU and GPU are expected to be handled by the application.

The application programming interface permits an application to specify resources to be used by a shader, executed by the GPU, through a data structure called, herein, "root arguments." A root signature is a data structure in an application that defines the layout of the root arguments used by an application. The root arguments are a data structure resulting from the application populating locations in memory according to the root signature. The root arguments can include one or more constant values or other state information, and/or one or more pointers to memory locations which can contain values, herein called "descriptors", and/or one or more references to memory locations that contain descriptors, also called "descriptor tables". Thus, the root arguments can support multiple levels of indirection through which a GPU can identify resources to bind to shaders.

The primary resource exposed by the application program interface to applications is the "descriptor", which is a data structure that includes a pointer to its location in memory as well as other configuration information, such as data format. Descriptors can be grouped together in a set of contiguous locations in memory, called herein a "descriptor heap". For example, for each type of resource, descriptors of that type can be grouped together in contiguous locations within the descriptor heap. A descriptor heap alternatively can correspond to a collection of descriptors of a single resource type or a mix of resource types that have unified storage. Using the API layer, applications allocate descriptor heaps and store descriptors in the descriptor heaps. To identify what portion of the heap a given shader will access, applications also can create descriptor tables. A descriptor table specifies one or more ranges within one or more descriptor heaps. The format of a descriptor table can be defined in the root signature.

Given any configuration of hardware capability and resource types, there may be a maximum supported size of any root signature, descriptor heap, or descriptor table and a maximum supported number of descriptor tables, thus allowing applications to adapt to the level of capability of any given hardware. The API layer 208 can detect the available hardware, and classify the hardware in one of plurality of tiers. Each tier represents a level of capabilities of the hardware. These capabilities can be enforced as restrictions on resource allocation and binding by the application.

When compiling shaders to be used with an application, a GPU driver examines the root signature defined by an application to determine where to find data and state that the application will make available to the shaders. At run time, to make resources available for access by shaders, an application populates the root arguments according to the root signature. If those resources include descriptor tables, then the application loads descriptors into one or more descriptor heaps. Such loading can occur any time in advance of the GPU actually referencing the data during shader execution. The descriptors can be identified individually, by descriptor heap or by a descriptor table in the root arguments, for which the layout is defined in the root signature. Shaders, when executing, refer to the resources made available to them by the GPU according to the root arguments. The shader can be executed again with different resources, for example, if those resources are already in memory, such as in the root arguments, or are specified in one or more descriptor heaps. The application can update the values in the root arguments, such as by changing values stored in a descriptor heap and pointing a descriptor table to it, or can change the root signature and provide new root arguments.

Thus, the application programming interface allows an application to create a root signature, populate and change the root arguments, and allocate and store descriptors, descriptor heaps and descriptor tables in memory. In turn, the GPU uses the root arguments to identify the resources to make available to shaders during execution. In the example implementation described herein, there are at least three types of entities that can be placed in the root arguments: 1. inline constants in the root arguments (minimum amount of indirection to get to the data from a shader), 2. inline descriptors in the root arguments (additional indirection to get to data from a shader, but making more data available), and 3. descriptor tables which add an additional level of indirection but provide maximum richness in the amount/types of data available to shaders. Because state of the root arguments is versioned by the driver or dedicated hardware as its state changes, the maximum size of the root arguments can be limited for efficiency. If the currently active root signature is switched, that defines a new binding space for which the application specifies the bindings (constants, descriptors and/or descriptor tables). The root signature permits different applications to specify different root arguments and populate the root arguments with an arbitrary mix of the different levels of indirection available.

Referring now to FIG. 3A, an example implementation of data structures for a descriptor, descriptor heap, descriptor table and root arguments will now be described in more detail.

A descriptor 300 is a small block of data that describes, whether fully or partially, an object to the GPU. There are many types of descriptors, with a descriptor format for each type of object or resource to be used by the GPU. Some examples of types of resources for which there is a descriptor include the following: index buffer, vertex buffer, shader resource, constant buffer, sampler, unordered access, stream output, render target and depth stencil. Descriptor size is specific to the hardware using the descriptors; the following example implementation assumes a descriptor size of about 64 bytes or less. A descriptor 300 generally has type-specific data 302 and a pointer 304 to the location of the data of that type in memory.

An application programming interface can be designed to provide direct access by applications to descriptor memory. Alternatively, the API can provide more abstract definitions of these resources, and can translate information provided by an application into descriptors, which the API then allocates in descriptor memory.

Descriptors can be stored in descriptor heaps. Descriptor heaps have two definitions—one from the perspective of the application programming interface 310, and another from the perspective of the hardware 320 being used.

From the application programming interface point of view, a descriptor heap is a collection of contiguous allocations of descriptor storage. A descriptor heap stores a collection of descriptors. Descriptors stored in a descriptor heap can be a collection of different object types that can be represented in unified storage. Alternatively, the descriptors stored in a descriptor heap can be a single object type. Such allocations can be enabled for each of the different object types that are available for applications to use.

As an example of a collection of object types represented in unified storage, constant buffers, shader resources and unordered access types of descriptors can be combined in a unified descriptor heap, and thus in a contiguous set of memory locations. In such an implementation, applications can arbitrarily mix descriptors of different types together within the one heap. A single descriptor table (described below) can point to a collection of different descriptors of different descriptor types in a descriptor heap, which the hardware can represent with unified storage (i.e., a contiguous set of memory locations).

From the hardware point of view, a single API descriptor heap can map to multiple hardware heaps, depending on the hardware. GPU hardware differs in the extent to which different resource types share a hardware heap. Generally a hardware descriptor heap is an allocation of a fixed amount of video memory for each type, or collection of types, of resources. Different types may have different heap size limits, and those types that share a heap generally share, in the aggregate, the same heap size limit.

Thus each API descriptor heap 310 can span all object types, either with dedicated storage for each type or a collection of types that can be represented in unified storage. If the heap is limited to a particular type of storage, the type can be noted at 312. Also, a descriptor heap can be defined as visible or not visible, as indicated at 314. A non-visible heap is not intended to be accessed by a shader, and can be used to stage descriptors. A visible heap can be accessed by a shader running on the GPU. A hardware descriptor heap 320 provides dedicated storage for one or more types 322 with specified hardware limits 324, which are specific to any implementation. Through the API, an application sets up descriptor heaps, and the system or GPU driver, depending on the hardware specifications, allocates corresponding hardware descriptor heaps, ensuring that the heaps fall within their heap size limits of the underlying hardware.

One purpose of a descriptor heap is to encompass a bulk of memory allocation for storing the descriptor specifications which an application is using, for as large of a window of rendering as possible, e.g., a frame or more. The descriptor heap can encompass all descriptors of all object types, or a subset of these. As described below in connection with descriptor tables, shaders then can be directed to quickly change which sets of descriptors within a descriptor heap are being used, and thus reduce CPU overhead, if the descriptors to be used are all stored in a descriptor heap. Additionally, with multiple API descriptor heaps, if their aggregate size falls within the hardware heap size limits, then the cost of switching between API descriptor heaps can be virtually free. Switching hardware heaps on some hardware can require the GPU to retire currently executing work.

Given an allocation of a descriptor heap, an application issues API commands to populate the descriptor heap with object descriptors. Such commands can occur in command lists or bundles that are processed by the runtime engine. Each command list has a current descriptor heap as part of its context, which can also be defined through the API by an application. This recording of edits in a command list allows systems with separate CPU memory and GPU memory to ensure that the GPU sees the edits by copying the edits to the GPU as necessary; however, on systems where the CPU and GPU share memory, no copy is needed. The API can also provide an "offline" descriptor heap that is always in CPU memory where applications can freely populate descriptors in a free threaded way. With such an offline descriptor heap, descriptors can be copied to "online" descriptor heaps via command lists or bundles only when needed by the GPU.

To further facilitate the ability to store large descriptor heaps and allow shaders to switch the descriptors currently being used, another data structure called descriptor tables is used. A descriptor table is one or more arrays of descriptors, and thus can be defined as one or more subranges of a descriptor heap. It is possible to define nested descriptor tables, wherein a desired descriptor table is selected by indexing within another descriptor table. A range defined by a descriptor table can encompass a single object type or multiple object types. The application uses an API construct to define a descriptor table 330. A subrange of the current descriptor heap can be specified in a number of ways, for example by specifying an offset 334 and optional length 336 for each subrange. The length is optional because the hardware can operate without knowledge of an upper bound of the range, as shaders generally access descriptors using offsets from the base offset 334. Similarly, the API layer specifies a descriptor table 340 to the hardware as one or more offset(s) 344 and optional length 346 in the corresponding descriptor heap.

An example implementation of data structures for the root arguments 350 will now be described in more detail.

The application can specify a root signature and then populate the data within the root arguments in memory to be accessed by the GPU. Some hardware configurations may limit the size of the root arguments, and provide it at a designated location in memory; other hardware configurations may be more flexible. The API layer defines a layer of abstraction through which an application can allocate the root arguments and can validate the root signature against hardware to ensure the root arguments are within hardware limits. The root arguments 350 include data defining one or more descriptor tables 352, optionally one or more root descriptors 354 and optionally one or more root constants 356. In exceptional cases, the root arguments also can be empty, or can define merely a root constant or merely a root descriptor.

A root descriptor is a descriptor that is referenced in the root arguments. By using root descriptors, a descriptor for a frequently changing, medium sized collection of, constants can be referred to by this root descriptor, which frees an application from having to version descriptors in a descriptor heap. Descriptors of constant buffer, unordered access and shader resource types, and other resource types such as samplers, can be useful candidates for use in a root descriptor.

A root constant is a constant value that is defined in the root descriptor, instead of being stored in a descriptor, such as a descriptor of the constant buffer type. This value in the root arguments can be used like a constant buffer descriptor by shaders. For example, a "drawID" value can be stored in the root constant by an application.

The root arguments are provided to enable each application to be customized with respect to how a small amount of driver/hardware versioned state memory is used by the application. A capability enabled by having the application declare a root signature is that descriptor tables, and their layout, can be defined in the root arguments, which enables rich descriptor tables containing a mixture of descriptor types.

Figure 3B:
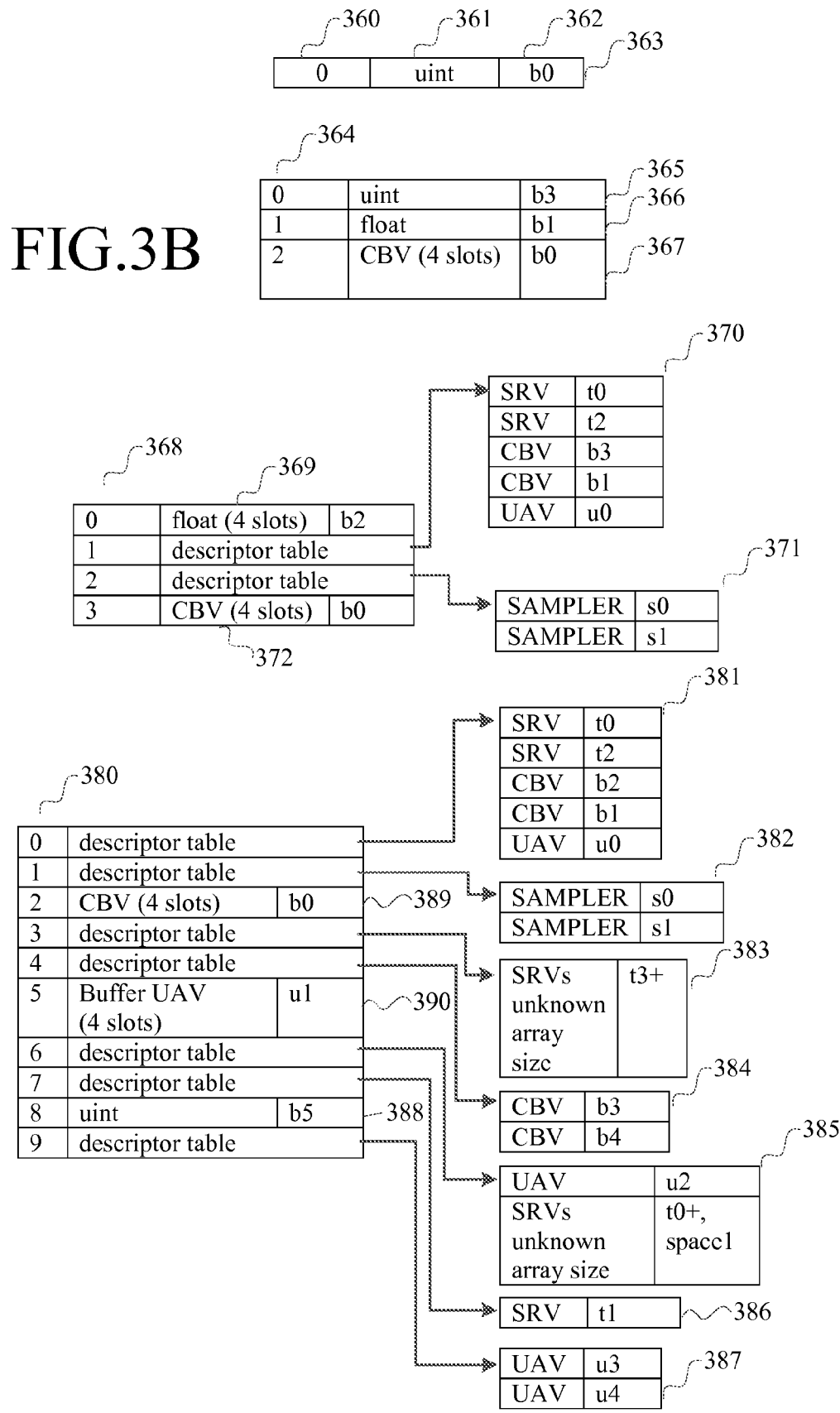
FIG. 3B is a diagram of example root signatures.

Examples of root signatures are shown in FIG. 3B. In these examples, there are three columns of information shown for each entry in a root arguments: a slot number 360 used by the application programming interface indicating a slot in the root arguments used by this entry, a type 361 indicating the type of data stored in the slot, and the shader binding slot 362 indicating how this data is bound to the shader. In this example, the shader binding slot is shown as an HLSL binding slot.

A first example root signature 363 specifies a root constant as an unsigned integer. A second example root signature 364 specifies two root constants 365 (an unsigned integer) and 366 (a floating point value) and a root descriptor 367 for a constant buffer descriptor.

A third example root signature 368 specifies a root constant 369 (a large floating point value), two descriptor tables 370 and 371, and a constant buffer descriptor 372. The first descriptor table 370 includes two references to shader resource descriptors, two references to constant buffer descriptors and a reference to an unordered access descriptor. The second descriptor table includes two references to sampler descriptors.

A fourth example root signature 380 specifies descriptor tables 381, 382, 383, 384, 385, 386 and 387, a root constant (integer) 388, and two root descriptors 389 (a constant buffer type) and 390 (an unordered access type).

The use of a root signature and root arguments, with descriptors, descriptor heaps and descriptor tables, enables a significant reduction in CPU overhead in binding resources to shaders when assigning work to a GPU. The reduction in CPU overhead comes initially through the separation of descriptor heap management from descriptor table and root arguments management, which allows applications to reduce binding cost. In particular, applications can pre-generate or reuse descriptor heap contents in advance of instructing the GPU to perform work. Thus, when submitting work to a GPU to be performed, the application merely populates the root arguments and any descriptor table(s) to which the root arguments refers.

Another benefit of using root arguments, descriptor tables and descriptor heaps, is that shader programs can be isolated from knowledge of the location and amount of source data and/or data descriptors which the shader programs will use. An application assembles a collection of different resource types to be referenced by the GPU by populating the root arguments and multiple descriptor tables. The application programming interface and underlying system handles, versioning root arguments, allocating descriptor heaps and storing descriptor objects in response to instructions from the application. The GPU in turn receives data, state information and other information for each resource type about data for that resource type being located at a particular offset and range within a heap.

Similarly, applications can be isolated from knowledge of implementation of the GPU hardware in supporting descriptor heaps for different resource types. The application programming interface allows an application to specify a monolithic descriptor heap, and in turn interfaces with the hardware implementation, which may manage different descriptor heaps for different resource types and/or may combine some resource types into the same descriptor heap in unified storage.

The amount of flexibility available for root arguments, and in the descriptors, descriptor heaps and descriptor tables, varies by the level of capability of the GPU, and is supported by the API having API level root arguments, descriptor heaps and descriptor tables and hardware specific descriptor heaps and descriptor tables, where the GPU drive can map between the two, to hide implementation details from the application. More modern GPUs generally have fewer constraints. For instance, on more modern hardware the maximum size of a descriptor heap increases, the maximum size of a given descriptor table increases, the number of descriptor tables that can be simultaneously active increases, and the level of ability for a shader to dynamically select a resource out of a descriptor table increases. The maximum heap size, maximum descriptor table size, maximum number of descriptor tables, root signature size and location, and whether dynamic indexing within a descriptor table is supported, are examples of limits of underlying hardware that can be enforced by the application programming interface. This flexibility and enforcement of limits also allows such techniques to be provided by an application programming interface that supports several different hardware platforms.

Commands for recording and issuing tasks for the GPU, which include editing descriptor heaps and descriptor tables and defining command lists, can also be recorded/issued by multiple CPU threads in parallel. Thus, applications can operate on different regions of a heap simultaneously. So in addition to CPU-GPU parallelism, parallelism across CPU threads also works efficiently with respect to binding management.

The separation of descriptor heap management from descriptor table management also supports multiple different kinds of uses.

As one example, if an application is rapidly switching between sets of descriptors which are being generated by the CPU while the application is submitting work to the GPU, the aggregate set of descriptors referenced by all the submitted work can be spread out into unique locations in the descriptor heap. The GPU can proceed to reference some parts of the descriptor heap even as the application is preparing future work by configuring other parts of the descriptor heap.

Figure 4:
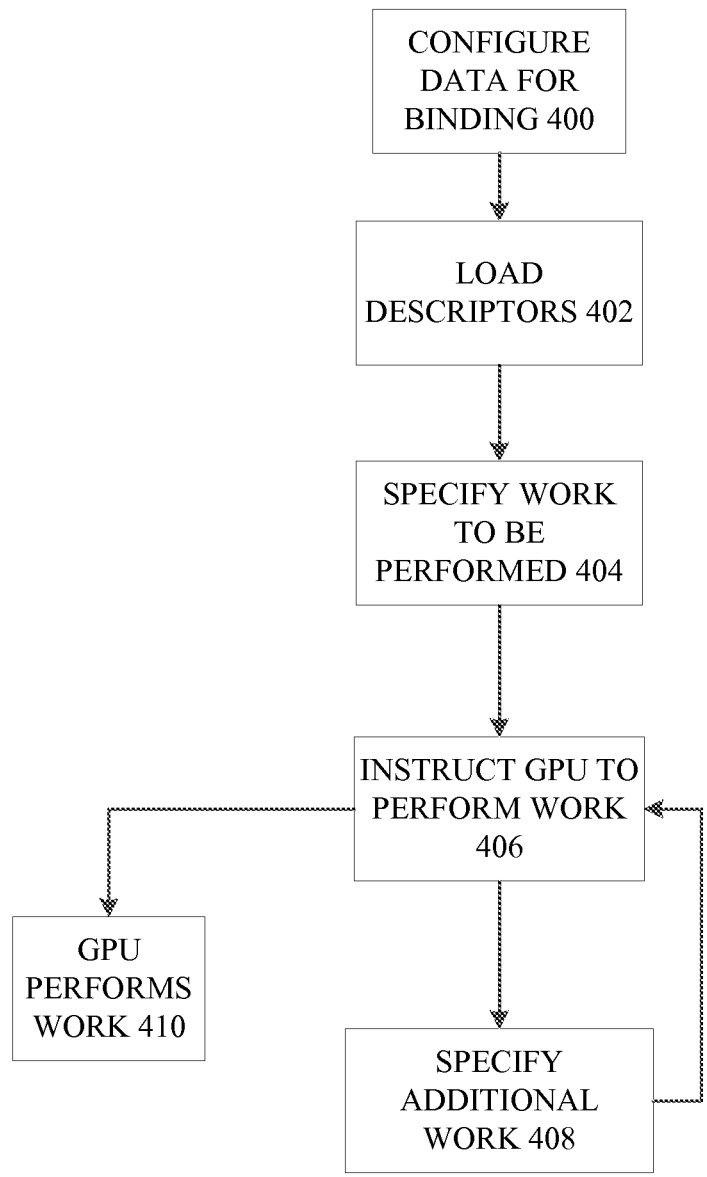
FIG. 4 is a flow chart describing an example use of such a system.
Figure 5:
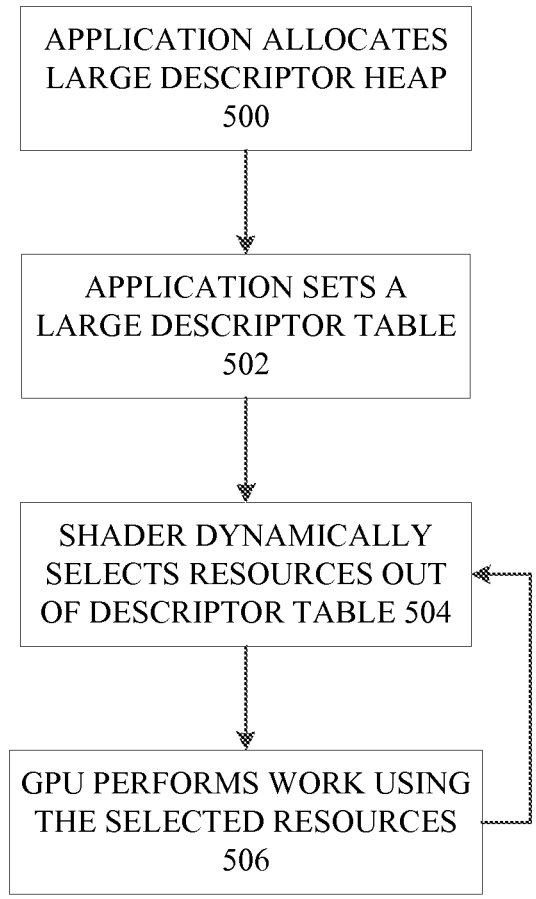
FIG. 5 is a flow chart describing another example use of such a system.

Thus, as shown in FIG. 4, an application configures 400 various data to define the binding between shaders and resources to be used by the shaders. For example, the application includes a root signature, and specifies descriptors, descriptor tables, and shader and pipeline states. The root signature is used by the driver shader compiler to compile a shader so as to include the references for the resources to be used by the shader as specified by the root signature. After initialization occurs at runtime of the application, the application can then load 402 descriptors. For example, the application can load a first set of descriptors into a first part of a descriptor heap.

Then, to specify 404 the work to be performed, the application can perform a number of steps. At this time, or prior to this time, additional descriptors can be populated in a descriptor heap, for example. The current descriptor heaps to be used are set. The root arguments are populated to define the current binding space. In particular, any descriptor tables specified by the root arguments are populated to refer to the desired descriptors in the descriptor heap. Any root descriptors or root constants also are set. The pipeline state for rendering or other compute operation being performed is then set.

The GPU is instructed 406 to perform work using the bindings established by the root arguments. While the first set of work is being performed 410 by the GPU, the application can, in parallel, change the resources the shader will use next, which may include loading more descriptors into the descriptor heap, populating the root arguments and any descriptor tables, root descriptors and root constants for the next stage of processing. Thus, the next work that GPU is instructed to perform can refer to another part of the descriptor heap, specified, for example, by new values in a descriptor table. After the GPU completes a current set of work, the application can again instruct 406 the GPU to perform 410 another set of work. This process can repeat with the GPU performing 410 work in parallel with the application specifying 408 the next set of work to be performed by the GPU.

Figure 6:
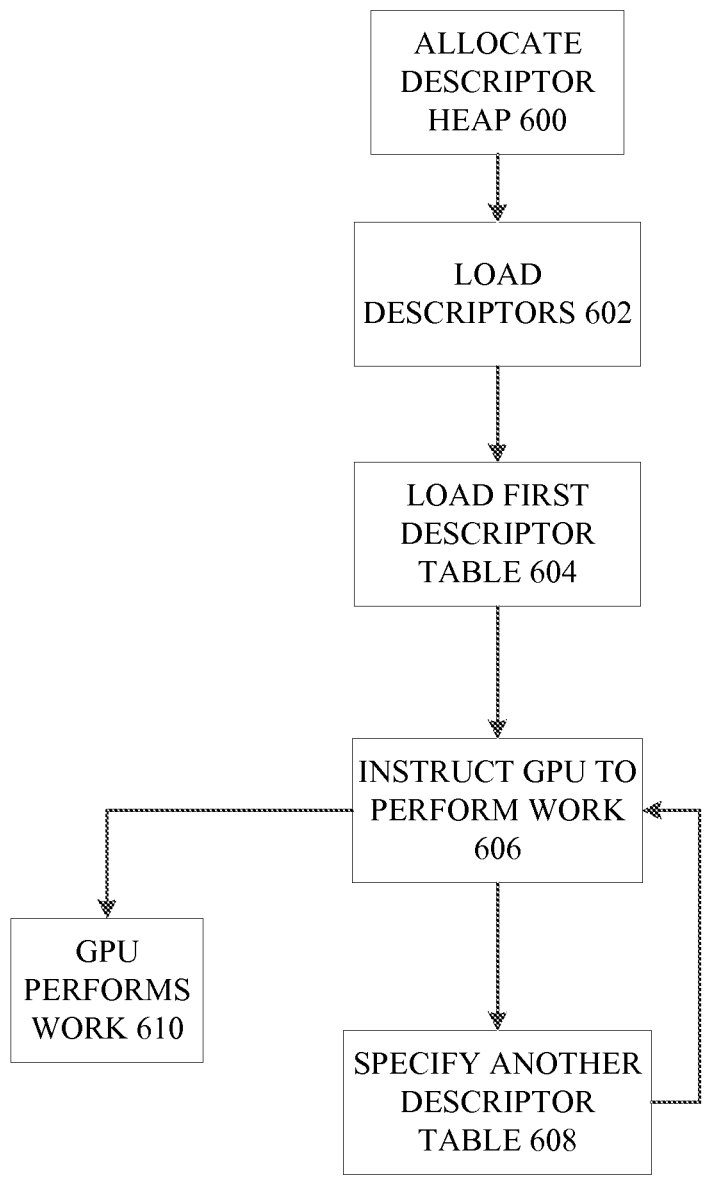
FIG. 6 is a flow chart describing another example use of such a system.

As another example, an application can prepare all of the descriptors in the descriptor heap ahead of time. Then, a descriptor table can be set for a relevant small area of the descriptor heap for each individual work item. That work item then can be submitted. The process then repeats for each individual work item. Thus, as shown in FIG. 6, the application allocates 600 a descriptor heap, then loads 602 all descriptors into the descriptor heap. A descriptor table corresponding to a first set of descriptors is defined 604 by populating values in the root arguments specifying the descriptor table for this item of work. Next, the GPU is instructed 606 to perform work according to the specified descriptor table referencing descriptors in the descriptor heap. After the first set of work has been recorded for execution or is being performed 610 by the GPU, the application can specify 608 another descriptor table for another part of the descriptor heap by updating the values in the root arguments. When the GPU executes the collection of work (typically all recorded in a command list before submission for execution), the sequence of root argument changes (like changing descriptor tables 606) enables the GPU to perform work (610) using different collections of data. This whole process can also repeat in a parallel fashion with the CPU or GPU recording a command list of a collection of work including changes to root arguments and signatures as new work is submitted (606 and 608) while previously recorded command lists are being executed by the GPU.

As another example, if an application is written so that shaders executing on the GPU are able to select from a large collection of resources on the fly, the application can put 500 all descriptors into a descriptor heap, set 502 a large descriptor table covering the large range. The shader then can dynamically select 504 any resource(s) out of the descriptor table, and then performs 506 its work. After completing processing using that selection, it can select any other resources using the descriptor table.

All of the foregoing scenarios can be supported within the same application, or even simultaneously for different resource types. For example, an application might have a global set of resources that never changes that can be left permanently bound via one descriptor table, while another set of resources switches frequently and can be served by a one or more descriptor tables in which values change at the desired frequency. The root arguments can define one or more descriptor tables. Changes to the root constants, root descriptors and descriptor tables can be accomplished by changing the root argument memory which the driver versions, so that whenever any subset of the state changes, a new version of the entire current state can be maintained so that multiple different settings of the root arguments can be in flight on the GPU.

In some implementations, the GPU supports receiving, and the API provides a mechanism for delivering sets of per-command constants, herein called "pipelined constants". To help applications more easily drive dynamic selection of resources or data within resources from shaders, applications can pass pipelined constants to shaders directly from the CPU when Draw/Dispatch commands are issued. Pipelined constants can be used to provide additional application-defined values to shaders. Such an implementation can be supported by adding parameters to Draw/Dispatch APIs to allow for additional values, or by adding an additional mechanism to the API to allow applications to define a set of "pipelined constants". Such constants also can be defined as root constants in the root arguments.

While applications can use constant buffer resources as described above to pass constants to shaders, pipelined constants instead use small amounts of existing storage that the majority of GPUs already have available for pipelining state changes as GPU work is being submitted. For example, pipelined constants can be stored by GPU drivers in the same small storage area that descriptor table settings are stored.

An example use of pipelined constants is to allow an application to provide offsets that can be combined with existing VertexID and InstanceID counters that the pipeline provides to shaders automatically to help each shader invocation identify itself (and thus know what its task is, as distinct from other shaders). Having a small number of pipelined constants available can also significantly reduce pressure on descriptor heap storage. Particularly, every time a pipelined constant can handle a small amount of data that is changing at a high frequency, such as an instance seed value that the application uses to drive what all the shader work will do, one less descriptor heap slot and descriptor table setting are done.

Accordingly, in one aspect, a computer provides an application programming interface for applications to specify available resources for a graphics processing unit, the application programming interface allowing the resources to be defined in root arguments, the root arguments having a layout as defined by a root signature.

In another aspect, a computer provides application programming interface for applications to specify available resources for a graphics processing unit, wherein the application programming interface receives data describing a root signature and data defining root arguments in accordance with the root signature, receives an indication of work to be performed by the graphics processing unit using resources specified by the root arguments, and instructs the graphics processing unit to perform the specified work.

In one aspect, a computer can include a means for receiving root arguments indicating resources to be used by a graphics processing unit, wherein a layout of the root arguments is specified by the application using a root signature.

In one aspect a computer can include a means for receiving data describing a root signature and data defining root arguments in accordance with the root signature, and means for receiving an indication of work to be performed by the graphics processing unit using resources specified by the root arguments.

In any of the foregoing aspects, the application programming interface can receive data describing a root signature and data defining root arguments in accordance with the root signature, can receive an indication of work to be performed by the graphics processing unit using resources specified by the root arguments, and can instruct the graphics processing unit to perform the specified work.

In any of the foregoing aspects, the root signature can be configured to allow an application to specify at least one of: one or more root constants, or one or more root descriptors or one or more descriptor tables. The root signature can include only one root constant and no root descriptor or descriptor table, or only one root descriptor and no root constant or descriptor table, or only one descriptor table and no root constant and no root descriptor.

In any of the foregoing aspects, the resources can include descriptors stored in the memory, the descriptors being stored in one or more descriptor heaps referenced by one or more descriptor tables, with a descriptor table being defined in the root arguments as a range within a descriptor heap.

In any of the foregoing aspects, the root signature can be specified by the application.

In any of the foregoing aspects, an application can specify different root signatures for different work to be performed by the graphics processing unit.

In any of the foregoing aspects, an application can specify different root arguments for different work to be performed by the graphics processing unit.

In any of the foregoing aspects, the computer can include a central processing unit and a graphics processing unit, with a memory configured to be accessed by the graphics processing unit during execution of commands. The central processing unit can be configured to execute an operating system that is configured to manage access by applications running on the central processing unit to resources in the computer system including the graphics processing unit and memory. The operating system can be configured to support an application programming interface that is configured to manage execution of commands by the graphics processing unit and through which the applications specify commands to the graphics processing unit. Such commands can include specifying shaders to be executed by the graphics processing unit and resources to be used by the shaders.

In any of the foregoing aspects, the application programming interface can be further configured to receive, from applications, descriptor heap contents in advance of instructing the graphics processing unit to perform work, to receive an instruction from the application including root arguments defining one or more descriptor tables, and to instruct the GPU to perform work using descriptors referenced by the one or more descriptor tables.

In any of the foregoing aspects, an application can be configured to define descriptor heap, load a set of descriptors, and instruct the GPU to begin processing work using the loaded sets of descriptors defined by one or more descriptor tables, each referencing a portion of the descriptor heap. After the GPU is instructed to process the work, the application can generate additional sets of descriptors that are loaded into other portions of the descriptor heap, and instruct the GPU to process work using sets of descriptors defined by one or more other descriptor tables referencing the other portions of the descriptor heap.

In any of the foregoing aspects, the application can be configured to load sets of descriptors in a descriptor heap, and instruct the GPU to perform work using descriptors in the descriptor heap as referenced by a large descriptor table covering the descriptor heap, such that the shaders executing on the GPU are configured to dynamically select any resource(s) using the descriptor table.

In any of the foregoing aspects, the computer system can include a mechanism for the application to define and pass to the GPU pipelined constants, for example by including constants in the root signature.

In any of the foregoing aspects, an application can be configured to, for a first collection of resources, define a descriptor heap, load sets of descriptors, and instruct the GPU to begin processing work using the loaded sets of descriptors defined by one or more descriptor tables, each referencing a portion of the descriptor heap. After the GPU is instructed to process the work, the application can generate additional sets of descriptors in other portions of the descriptor heap, and instruct the GPU to process work using sets of descriptors defined by one or more other descriptor tables referencing the other portions of the descriptor heap. For a second collection of resources, the application can load a set of descriptors in a descriptor heap, and instruct the GPU to perform work using descriptors in the descriptor heap as referenced by a large descriptor table covering the descriptor heap, such that the shaders executing on the GPU are configured to dynamically select any resource of the second collection of resources using the large descriptor table.

In any of the foregoing aspects, the application programming interface can be configured to define application programming interface descriptor heaps and descriptor tables accessed by applications, and hardware-specific descriptor heaps and descriptor tables accessible by hardware, and wherein the application programming interface includes a graphics kernel configured to map between the application programming interface descriptor heaps and the hardware-specific descriptor heaps and configured to map between the application programming interface descriptor tables and the hardware specific descriptor tables.

In any of the foregoing aspects, the application programming interface can be configured to identify and enforce limits of the hardware with respect to descriptor use. Such limits can include any one of or combination of: root argument size, maximum descriptor size, maximum descriptor heap size, maximum descriptor table size, ability to dynamically index within descriptor tables.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computer system, comprising:
a central processing unit;
a graphics processing unit;
memory configured to be accessed by the graphics processing unit during execution of commands;
the central processing unit configured to execute an operating system that is configured to manage access by applications running on the central processing unit to resources in the computer system including the graphics processing unit and memory,
wherein the operating system provides an application programming interface that is configured to manage execution of commands by the graphics processing unit and through which the applications running on the central processing unit specify, through a runtime engine, commands to the graphics processing unit,
wherein the application running on the central processing unit is operative at runtime to specify commands through the application programming interface including commands specifying shaders to be executed by the graphics processing unit and resources to be used by the shaders,
wherein at runtime the graphics processing unit is operative to execute the shaders using the resource specified by the commands from the application using descriptors stored in the memory to access the resources, and
wherein the commands specify the resources to be used by the shaders by indicating root arguments, wherein the root arguments have a structure defined by the application using a root signature, wherein the shader accesses resources using the descriptors stored in the memory as specified by the root arguments.

2. The computer system of claim 1, wherein the resources include descriptors stored in the memory, the descriptors being stored in one or more descriptor heaps referenced by one or more descriptor tables, with a descriptor table being defined in the root arguments as a range within a descriptor heap.

3. The computer system of claim 1, wherein the application programming interface is further configured to:
receive, from applications, descriptor heap contents in advance of instructing the graphics processing unit to perform work;
receive an instruction from the application including root arguments defining one or more descriptor tables; and
instruct the GPU to perform work using descriptors referenced by the one or more descriptor tables.

4. The computer system of claim 1, wherein an application is configured to:
define descriptor heap, load a set of descriptors, and instruct the GPU to begin processing work using the loaded sets of descriptors defined by one or more descriptor tables, each referencing a portion of the descriptor heap, and
generate, after the GPU is instructed to process the work, additional sets of descriptors that are loaded into other portions of the descriptor heap, and
instruct the GPU to process work using sets of descriptors defined by one or more other descriptor tables referencing the other portions of the descriptor heap.

5. The computer system of claim 1, wherein the application is configured to:
load sets of descriptors in a descriptor heap, and
instruct the GPU to perform work using descriptors in the descriptor heap as referenced by a large descriptor table covering the descriptor heap, such that the shaders executing on the GPU are configured to dynamically select any resource(s) using the descriptor table.

6. The computer system of claim 1, further comprising a mechanism for the application to define and pass to the GPU pipelined constants.

7. The computer system of claim 1, wherein an application is configured to:
for a first collection of resources, define a descriptor heap, load sets of descriptors, and instruct the GPU to begin processing work using the loaded sets of descriptors defined by one or more descriptor tables, each referencing a portion of the descriptor heap, and, generate, after the GPU is instructed to process the work, additional sets of descriptors in other portions of the descriptor heap, and instruct the GPU to process work using sets of descriptors defined by one or more other descriptor tables referencing the other portions of the descriptor heap; and for a second collection of resources, load a set of descriptors in a descriptor heap, instruct the GPU to perform work using descriptors in the descriptor heap as referenced by a large descriptor table covering the descriptor heap, such that the shaders executing on the GPU are configured to dynamically select any resource of the second collection of resources using the large descriptor table.

8. The computer system of claim 1, wherein the application programming interface is configured to define application programming interface descriptor heaps and descriptor tables accessed by applications, and hardware-specific descriptor heaps and descriptor tables accessible by hardware, and wherein the application programming interface includes a graphics kernel configured to map between the application programming interface descriptor heaps and the hardware-specific descriptor heaps and configured to map between the application programming interface descriptor tables and the hardware specific descriptor tables.

9. The computer system of claim 1, wherein the root signature is configured to allow an application to specify at least one of one or more root constants, or one or more root descriptors or one or more descriptor tables.

10. The computer system of claim 8, wherein the application programming interface is configured to identify and enforce limits of the hardware with respect to descriptor use.

11. The computer system of claim 10, wherein the limits include maximum descriptor heap size.

12. The computer system of claim 10, wherein the limits include ability to dynamically index within descriptor tables.

13. The computer system of claim 1, wherein the root signature is a data structure in an application that defines the layout of the root arguments used by an application.

14. The computer system of claim 13, wherein the root arguments are a data structure resulting from the application populating locations in memory according to the root signature.

15. A computer program product for use with a computer having a central processing unit and a graphics processing unit and memory accessible by the graphics processing unit during execution of commands, wherein the central processing unit executes an operating system that manages access by applications running on the central processing unit to resources in the computer system including the graphics processing unit and memory, wherein the operating system providing an application programming interface managing execution of commands by the graphics processing unit, the computer program product comprising:

a computer readable storage device having computer program instructions stored thereon, the computer program instructions, when processed by the computer, defining the application programming interface managing execution of commands by the graphics processing unit and through which applications running on the central processing unit specify, through a runtime engine, commands to the graphics processing unit, wherein the application running on the central processing unit is operative at runtime to specify commands through the application programming interface including commands specifying shaders to be executed by the graphics processing unit and resources to be used by the shaders, wherein at runtime, the graphics processing unit is operative to execute the shader using the resources specified by the commands from the application, using descriptors stored in the memory to access the resources, wherein the descriptors are stored in the memory in one or more descriptor heaps referenced by one or more descriptor tables, wherein a descriptor table is defined by root arguments as a range within a descriptor heap, wherein the shader is bound to descriptors for resources to be accessed in accordance with the root arguments.

16. The computer program product of claim 15, wherein:

the application programming interface receives from applications descriptor heap contents in advance of instructing the graphics processing unit to perform work; and the application programming interface receives an instruction from the application including root arguments specifying one or more descriptor tables instructing the GPU to perform work using the descriptors referenced by the one or more descriptor tables.

17. The computer program product of claim 15, wherein an application configures a descriptor heap, loads sets of descriptors, instructs the GPU to begin processing work using the loaded sets of descriptors defined by one or more descriptor tables, each referencing a portion of the descriptor heap, and, after the GPU is instructed to process the work, the application generates additional sets of descriptors that are loaded into other portions of the descriptor heap, and then instructs the GPU to process work using sets of descriptors defined by one or more other descriptor tables referencing the other portions of the descriptor heap.

18. The computer program product of claim 15, wherein the application loads sets of descriptors in a descriptor heap, instructs the GPU to perform work using descriptors in the descriptor heap as referenced by a large descriptor table covering the descriptor heap, wherein the shaders executing on the GPU then dynamically select any resource(s) using the descriptor table.

19. The computer program product of claim 15, wherein the driver further comprises a mechanism for the application to define and pass to the GPU pipelined constants.

20. The computer program product of claim 15, wherein an application, for a first collection of resources, configures a descriptor heap, loads sets of descriptors, instructs the GPU to begin processing work using the loaded sets of descriptors defined by one or more descriptor tables, each referencing a portion of the descriptor heap, and, after the GPU is instructed to process the work, the application generates additional sets of descriptors that are loaded into other portions of the descriptor heap, and then instructs the GPU to process work using sets of descriptors defined by one or more other descriptor tables referencing the other portions of the descriptor heap; and for a second collection of resources, loads sets of descriptors in a descriptor heap, instructs the GPU to perform work using descriptors in the descriptor heap as referenced by a large descriptor table covering the descriptor heap, wherein the shaders executing on the GPU then dynamically select any resource of the second collection of resources using the large descriptor table.

21. The computer program product of claim 15, wherein the application programming interface defines application programming interface descriptor heaps and descriptor tables accessed by applications, and hardware-specific descriptor heaps and descriptor tables accessible by hardware, and wherein the application programming interface maps between the application programming interface descriptor heaps and the hardware-specific descriptor heaps and maps between the application programming interface descriptor tables and the hardware specific descriptor tables.

22. A computer implemented process for allocating resources for processing in a computer having a central processing unit and a graphics processing unit and memory accessible by the graphics processing unit during execution of commands, wherein the central processing unit executes an operating system that manages access by applications running on the central processing unit to resources in the computer system including the graphics processing unit and memory, wherein the operating system provides an application programming interface managing execution of commands through a runtime engine by the graphics processing unit, the process comprising:

an application, running on the central processing unit, specifying commands through the application programming interface, the commands specifying shaders to be executed by the graphics processing unit and resources to be used by the shaders, the resources being accessed using descriptors stored in the memory;

the application storing, at runtime, the descriptors in one or more descriptor heaps referenced by one or more descriptor tables, with a descriptor table being defined by root arguments as a range within a descriptor heap; and the graphics processing unit executing, at runtime, the specified shader descriptors, for resources to be accessed by the shader when the shader is executed by the graphics processing unit, and binding the descriptors to the specified shader in accordance with the root arguments.

* * * * *